Feb. 10, 1931.                H. F. KENSLOW                1,791,596
                                   RIM
                            Filed March 20, 1925

WITNESS:                                    H. F. Kenslow,
                                                  INVENTOR
                                         BY Victor J. Evans
                                                  ATTORNEY Patented Feb. 10, 1931

1,791,596

UNITED STATES PATENT OFFICE

HENRY F. KENSLOW, OF SAPULPA, OKLAHOMA

RIM

Application filed March 20, 1925. Serial No. 17,043.

This invention relates to improvements in rims for holding pneumatic and other tires on the rims of vehicles the general object of the invention being to provide means whereby a tire can be easily and quickly removed from and placed on its rim without removing the rim from the wheel.

Another object of the invention is to provide means whereby the rim can be removed from the wheel when the tire is to be used as a spare.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
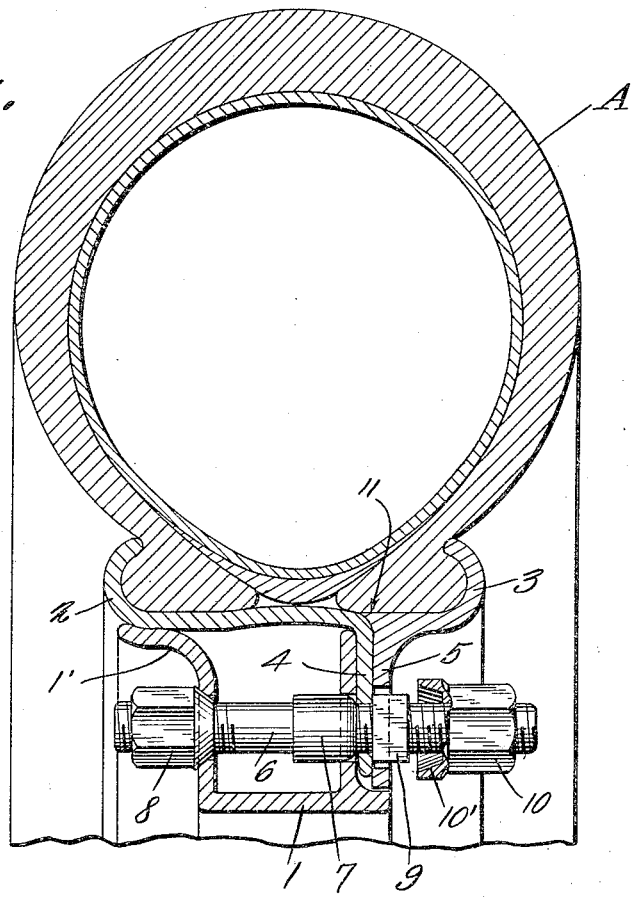
Figure 1 is a transverse sectional view through a felly, the improved rim and a tire.
Figure 2:
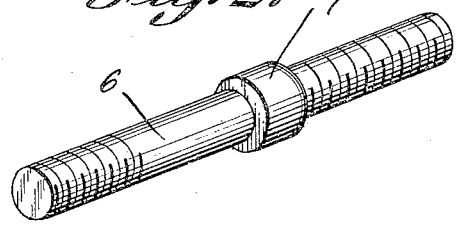
Figure 2 is a perspective view of one of the bolts used for holding the parts together.

In these views, 1 indicates a felly, which is of channel shape in cross section with its inner flange having a flaring outer portion 1' which forms the seat for a part of the tire rim. This rim is composed of the sections 2 and 3, the section 2 engaging the portion 1' of the felly. This section is of much greater width than the section 3 and constitutes the major portion of the rim. The said section 2 is provided with an inwardly extending flange 4 on its outer edge and the section 3 is provided with a similar flange 5 on its inner edge which abuts the flange 4 when the sections are placed together. The section 2, when in place, has its flange 4 engaging the outer face of the outer flange of the felly 1. Bolts 6, each of which is provided with a collar 7 having a rounded outer end, are provided for holding the parts together, these bolts passing through holes in the flanges of the felly and through holes formed in the flanges 4 and 5. A nut 8 is placed on the inner end of each bolt and has its inner end beveled to engage the beveled walls of a hole formed in the inner flange of the felly. The shoulder 7 of each bolt projects through the hole formed in the outer flange of the felly and abuts the flange 4 of section 2. The holes in flange 5 of section 3 are of larger diameter than those in the flange 4 and a nut 9, threaded on each bolt, passes through a hole in flange 5 and engages the flange 4 so as to clamp said flange between itself and the collar 7 on the bolt. A large nut 10 is threaded on the outer end of each bolt for holding the section 3 in place by clamping the flange 5 against the flange 4, said nut 10 having a countersunk part 10' for receiving a part of the nut 9.

From the foregoing and from an inspection of Figure 1, it will be seen that the parts of the rim are held in clamping engagement with the tire A and upon the felly by the bolts and nuts and when the tire is to be removed, it is simply necessary to remove the nuts 10 from the bolts which will permit the section 3 to be taken off so that the tire can be removed. The rest of the rim remains on the wheel. If the tire is to be used as a spare so that the rim must be removed from the wheel, the nuts 8 are removed from the bolts and this will permit the entire rim with the tire thereon to be removed from the felly 1, the bolts being pulled through the holes in the outer flange of the felly 1.

The bead engaging portions of the rim can be made of any desired type, that shown in the drawing being of the clincher type. A lip 11 is formed on the section 3 and this lip engages a rounded part of section 2 at the junction of the two sections.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a wheel including a felly, a two part rim including a rim portion proper and a tire retaining ring detachably mounted on said felly, a plurality of bolts extending through said felly and through openings in each of said rim parts, the openings in said rim portion proper through which said bolts extend being of substantially the same cross sectional area as said bolts whereby the latter serve to hold the rim portion proper against circumferential movement about said felly, a nut threaded on each bolt securing said rim parts together and also securing both of said rim parts to said felly, and a second nut threaded on one of said bolts securing said rim portion proper to the felly independently of the other rim part.

2. In combination with a wheel including a felly, a two part rim mounted on said felly, a bolt extending through said felly and through openings in each of said rim parts, the opening in one of said rim parts being of substantially the same cross sectional area as said bolt whereby the latter serves to hold such rim part against circumferential movement about said felly, the opening in the other rim part being of greater cross sectional area than said bolt, a nut threaded on said bolt against said first mentioned rim part securing the latter to said felly independently of said second mentioned rim part, said nut being disposed within the large opening in said second mentioned rim part and extending entirely through and beyond the outer face of the latter whereby it is accessible by a tool for manipulating same when both rim parts are in normal operative relation upon the felly, and a second nut threaded on said bolt securing said second mentioned rim part in assembly with said first mentioned rim part.

3. In combination with a wheel including a felly, a two part rim mounted on said felly, a bolt extending through said felly and through openings in each of said rim parts, the opening in one of said rim parts being of substantially the same cross sectional area as said bolt whereby the latter serves to hold such rim part against circumferential movement about said felly, the opening in the other rim part being of greater cross sectional area than said bolt, a nut threaded on said bolt against said first mentioned rim part securing the latter to said felly independently of said second mentioned rim part, said nut being disposed within the large opening in said second mentioned rim part and extending entirely through and beyond the outer face of the latter whereby it is accessible by a tool for manipulating same when both rim parts are in normal operative relation upon the felly, a cupped washer arranged on said bolt over said nut and engaging said second mentioned rim part, and a second nut on said bolt operating against said washer.

In testimony whereof I affix my signature.

HENRY F. KENSLOW.